(12) United States Patent
Yang et al.

(10) Patent No.: US 7,782,825 B2
(45) Date of Patent: Aug. 24, 2010

(54) METHODS AND ARRANGEMENTS FOR LINK RATE ADAPTATION IN MULTI-RADIO CO-EXISTENCE PLATFORMS

(75) Inventors: Xue Yang, Portland, OR (US); Allen C. Kim, Seongnam-Si (KR); Hsin-Yuo Liu, San Jose, CA (US); Xingang Guo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 581 days.

(21) Appl. No.: 11/731,563

(22) Filed: Mar. 30, 2007

(65) Prior Publication Data

US 2008/0242329 A1 Oct. 2, 2008

(51) Int. Cl.
*H04Q 7/24* (2006.01)
(52) U.S. Cl. ................. 370/338; 370/315; 455/550.1
(58) Field of Classification Search ............. 370/315, 370/328, 338; 455/550.1
See application file for complete search history.

(56) References Cited

U.S. PATENT DOCUMENTS 6,556,589 B2 * 4/2003 McRobert et al. .......... 370/501
2004/0229563 A1 * 11/2004 Fitton et al. ................. 455/7

* cited by examiner

*Primary Examiner*—Nhan Le
(74) *Attorney, Agent, or Firm*—Schubert Osterrieder & Nickelson PLLC; Neil Cohen

(57) ABSTRACT

Methods and arrangements for link rate adaptation in multi-radio co-existence platforms (MRPs) are contemplated. Embodiments include transformations, code, state machines or other logic to determine an overlap between receiving by a wireless device of the MRP and transmitting by other of the wireless devices of the MRP and to select a link rate of the wireless device of the MRP based upon the determining an overlap. The embodiments may also include communicating the determined link rate to a wireless device transmitting to the wireless device of the MRP. Embodiments may also include selecting a previously used link rate if the receiving overlaps the transmitting. Embodiments may also include basing the link rate upon an overlapping or non-overlapping Signal-to-Interference-Plus-Noise-Ratio depending on the relative amounts of overlapping and non-overlapping.

14 Claims, 4 Drawing Sheets

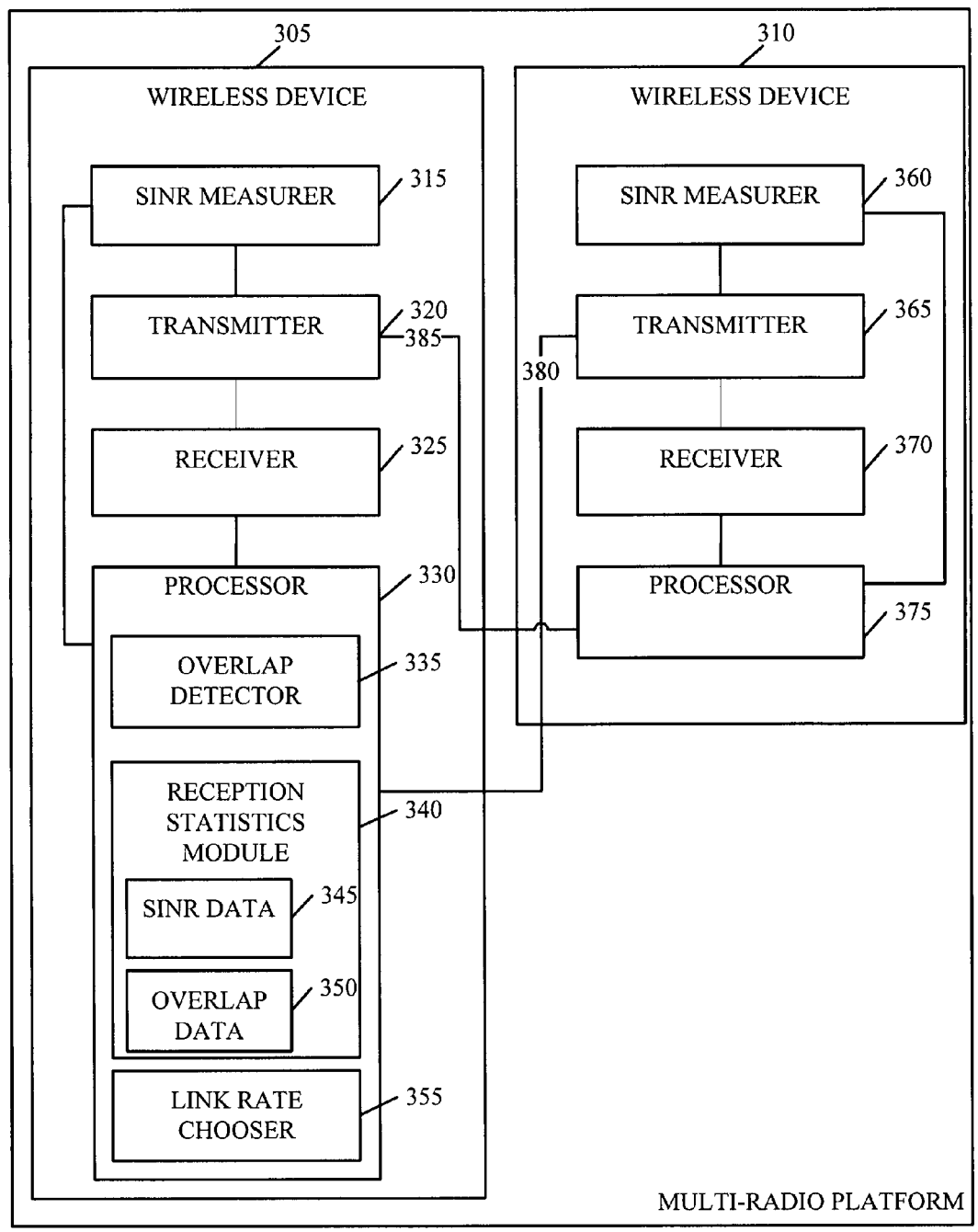

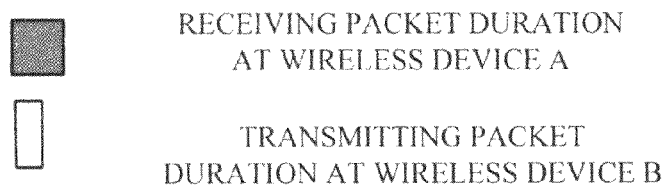
FIG. 4A
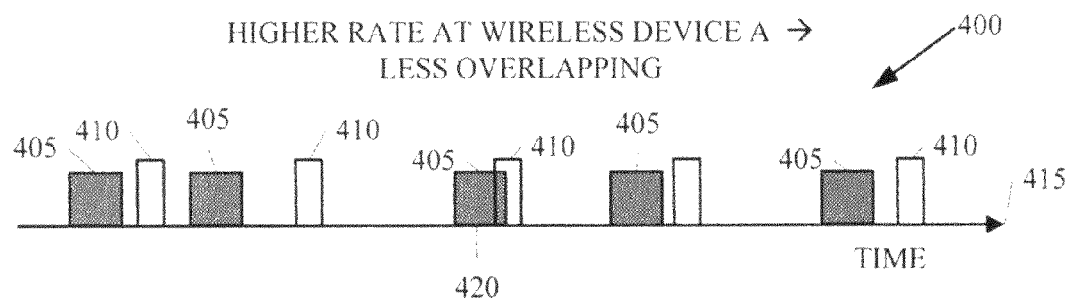
FIG. 4B
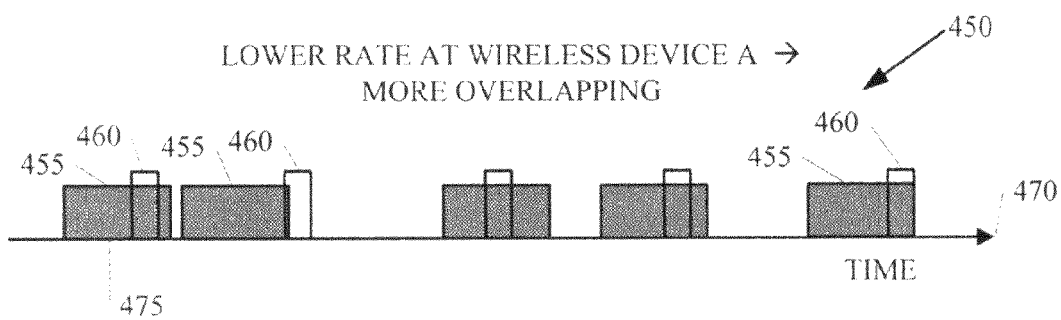

METHODS AND ARRANGEMENTS FOR LINK RATE ADAPTATION IN MULTI-RADIO CO-EXISTENCE PLATFORMS

FIELD

The present invention is in the field of wireless communications. More particularly, the present invention relates to methods and arrangements for link rate adaptation in multi-radio co-existence platforms.

BRIEF DESCRIPTION OF THE DRAWINGS

Aspects of the invention will become apparent upon reading the following detailed description and upon reference to the accompanying drawings in which like references may indicate similar elements:

FIG. 3 depicts an embodiment of a MRP; and

FIG. 4 depicts a graph of interference and link rates in an MRP.

DETAILED DESCRIPTION OF EMBODIMENTS

Figure 1:
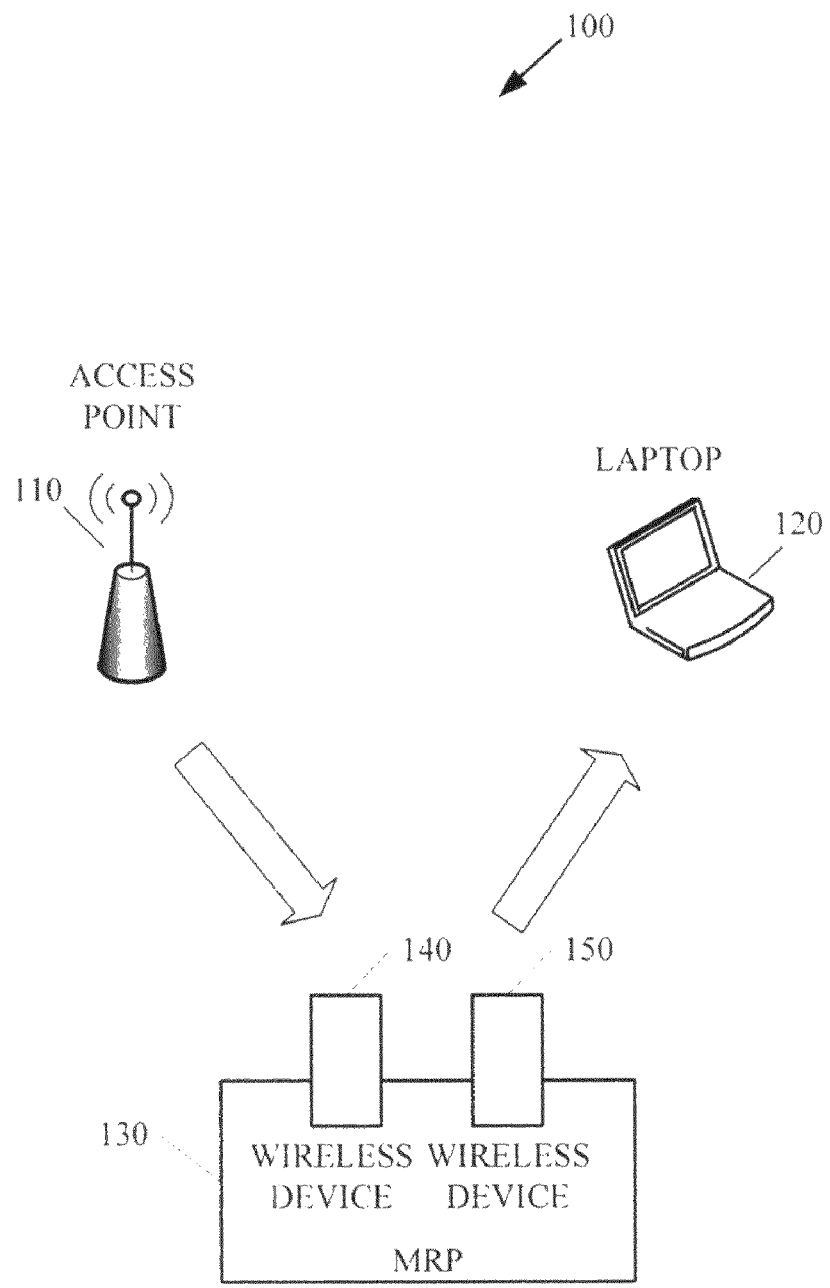
FIG. 1 depicts a network diagram of an embodiment of a wireless system including a multi-radio co-existence platform (MRP)

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Generally speaking, methods and arrangements for link rate adaptation in multi-radio co-existence platforms (MRPs) are contemplated. Embodiments include transformations, code, state machines or other logic to determine an overlap between receiving by a wireless device of the MRP and transmitting by other wireless devices of the MRP and to determine a link rate of the wireless device of the MRP based upon the determining an overlap. The embodiments may also include communicating the determined link rate to a wireless device transmitting to the wireless device of the MRP. Some embodiments may include determining whether there is an overlap between receiving by the wireless device of the MRP and transmitting by the other wireless devices of the MRP, and choosing the link rate previously used by the wireless device transmitting to the wireless device of the MRP if there is an overlap between receiving by the wireless device of the MRP and transmitting by the other wireless devices of the MRP. Other embodiments may include determining the ratio $$N_{Overlap}/(N_{Overlap}+N_{Non-overlap})$$

where $N_{Overlap}$ is an interval of overlap between receiving by the wireless device of the MRP and transmitting by the other wireless devices of the MRP, and where $N_{Overlap}$ is an interval of non-overlap between receiving by the wireless device of the MRP and transmitting by the other wireless devices of the MRP. The other embodiments may also include selecting a link rate based upon an overlapping Signal-to-Interference-Plus-Noise-Ratio (SINR) value if the ratio is above a threshold value and selecting a link rate based upon a non-overlapping SINR value if the ratio is below a threshold value.

While specific embodiments will be described below with reference to particular circuit or logic configurations, those of skill in the art will realize that embodiments of the present invention may advantageously be implemented with other substantially equivalent configurations.

With the widespread popularity of wireless technology, MRPs are appearing in increasing numbers. An MRP is a platform or device which contains two or more wireless devices or radios. Examples of MRPs include a cell phone with a Bluetooth® device and a laptop with a WiFi card and a Bluetooth device. A wireless device transmits and receives by means of radio frequencies. An RF transmitter may impress digital data onto an RF frequency for transmission of the data by electromagnetic radiation. The RF transmitter may, for instance, modulate a carrier wave. An RF receiver may receive electromagnetic energy at an RF frequency and extract the digital data. The RF receiver may, for example, demodulate the received radio waves. In an MRP, the operations of one wireless device may interfere with the operations of another. For example, one wireless device of the MRP may only be able to receive packets sent at a lower rate, or may not be able to receive at all, due to interference from the transmissions of another wireless device of the MRP. The interference may depend on the frequency spectrum and transmission power used by the constituent wireless devices, as well as the antenna separation between the receiving and transmitting wireless devices.

Current methods of reducing the effects of interference may not prove effective in combating interference in MRPs. One method is link rate adaptation. The link rate is the rate of transmission of the packets that comprise a wireless communication. A link rate adaptation method may vary the link rate in an attempt to maximize data throughput without compromising data transmission quality. In good channel conditions, link rate adaptation methods in use now typically suggest that a sender increases its transmission rate. Conversely, in poor channel conditions, such as the receipt of corrupted packets, lower data rates, which may provide greater protection for the data packets being transmitted, may be selected.

A link rate may be associated with channel condition thresholds in various forms. In general, high channel condition thresholds may be associated with high link rates, and low channel condition thresholds may be associated with low link rates. The channel conditions between a transmitter and a receiver are estimated at the receiver using any channel quality metric, such as carrier to interference (C/I) ratio or SINR. In some communication protocols the receiver may relay the estimate of channel condition via a feed back channel to the transmitter, and the transmitter may select a link rate. See the IEEE 802.11a standard, IEEE std. 802.11a-1999, published Feb. 11, 2000; the IEEE 802.11b standard, IEEE std. 802.11b-1999, published Feb. 11, 2000; and the IEEE 802.11g standard, IEEE std. 802.11g-2003, published Oct. 20, 2003. In other communication protocols, sender and receiver may negotiate a transmission rate based on SINR at the receiver. See the IEEE 802.11n standard, IEEE std. 802.11n, published in draft form Feb. 7, 2007; the IEEE 802.16 standard, IEEE std. 802.16-2004, published October, 2004.

The reduction in rates may, however, prove counterproductive when applied to MRPs. A low SINR due to overlapping transmissions at an MRP is dramatically different from a low SINR caused by poor channel condition. The low SINR from overlapping transmissions may tend to be short-lived. Once the overlapping transmissions are completed, the SINR at the receiving wireless device may return to a higher, more common value. Thus, reducing the link rate may cause slower transmission even after the brief interference terminates. In addition, a lower transmission rate to a wireless device on an MRP in an attempt to reduce the effects of interference may create additional interference with reception by the wireless device. If the link rates of transmissions from the MRP are kept unchanged, slowing the receiving link rate may increase the duration of receiving, and therefore the probability of interference between transmissions and receiving. In fact, there may even be a feedback loop. Slower link rates produce more interference, which leads to reduced SINR values. Under current link rate adaptation methods, the reduced SINR values in turn lead to even slower link rates. As a result of such a positive feedback loop, a receiving wireless device may end up operating at a lower link rate, even though it may perform better by receiving at a higher rate and minimizing the overlapping.

Coordinating mechanisms may also prove ineffective at reducing the effects of interference from overlapping reception and transmission by MRP wireless devices. First, the mechanisms may be very complicated. Moreover, coordinating mechanisms are inapplicable to many communications protocols. For example, when a wireless device at an MRP is using WiFi-like CSMA technology, the wireless device has no control over when a packet will need to be received. As such, coordinating mechanisms at MRP that aim to perform time division among different radios may not improve the successful reception probability for WiFi-like wireless devices located on MRPs.

FIG. 1 depicts a network diagram of an embodiment of a wireless system 100 including an MRP. Wireless system 100 uses link adaptation methods which may reduce the effects of overlapping transmissions. The system 100 includes access point 110, laptop 120, and MRP 130. MRP 130 includes wireless devices 140 and 150. Access point 110, laptop 120, radios 140 and 150 may include transmitters and receivers to transmit and receive over RF (radio frequency) channels. Access point 110 may comprise an access point for a wireless local area network (WLAN), operating according to the standards of IEEE 802.11. Access point 110 may be connected to a wireline network such as the Internet. Wireless devices such as wireless device 140 may communicate over a network by communicating with access point 110. Access point 110 may then relay the communications over the network.

Radios 140 and 150 may communicate simultaneously. In the example of FIG. 1, wireless device 140 is receiving a transmission from access point 110 and wireless device 150 is transmitting to laptop 120. Wireless device 150 may, for example, be a Bluetooth device. The transmissions of wireless device 150 may interfere with the reception of wireless device 140. In the embodiment of FIG. 1, wireless device 140 may adapt or modify the link rate of reception to reduce interference caused by the transmission of wireless device 150.

The type and arrangement of the devices making up the exemplary system illustrated in FIG. 1 are for explanation, not for limitation. In other embodiments, MRP may contain a wide variety of wireless devices, which may include NFC (Near Field Communications), WLAN (Wireless Local Area Network), WMAN (Wireless Metropolitan Area Network), WiMAX (Worldwide Interoperability for Microwave Access), 2.5-3 G cellular, RAN (Radio Access Network), 4 G, RFID (Radio Frequency Identification), and other wireless devices communicating according to other wireless protocols which may be known to those of skill in the art. Similarly, the wireless devices of an MRP may communicate with a wide variety of wireless devices in addition to those shown in the diagram of FIG. 1. Further, MRP is not limited to two devices. MRPs may contain three or more wireless devices.

Figure 2:
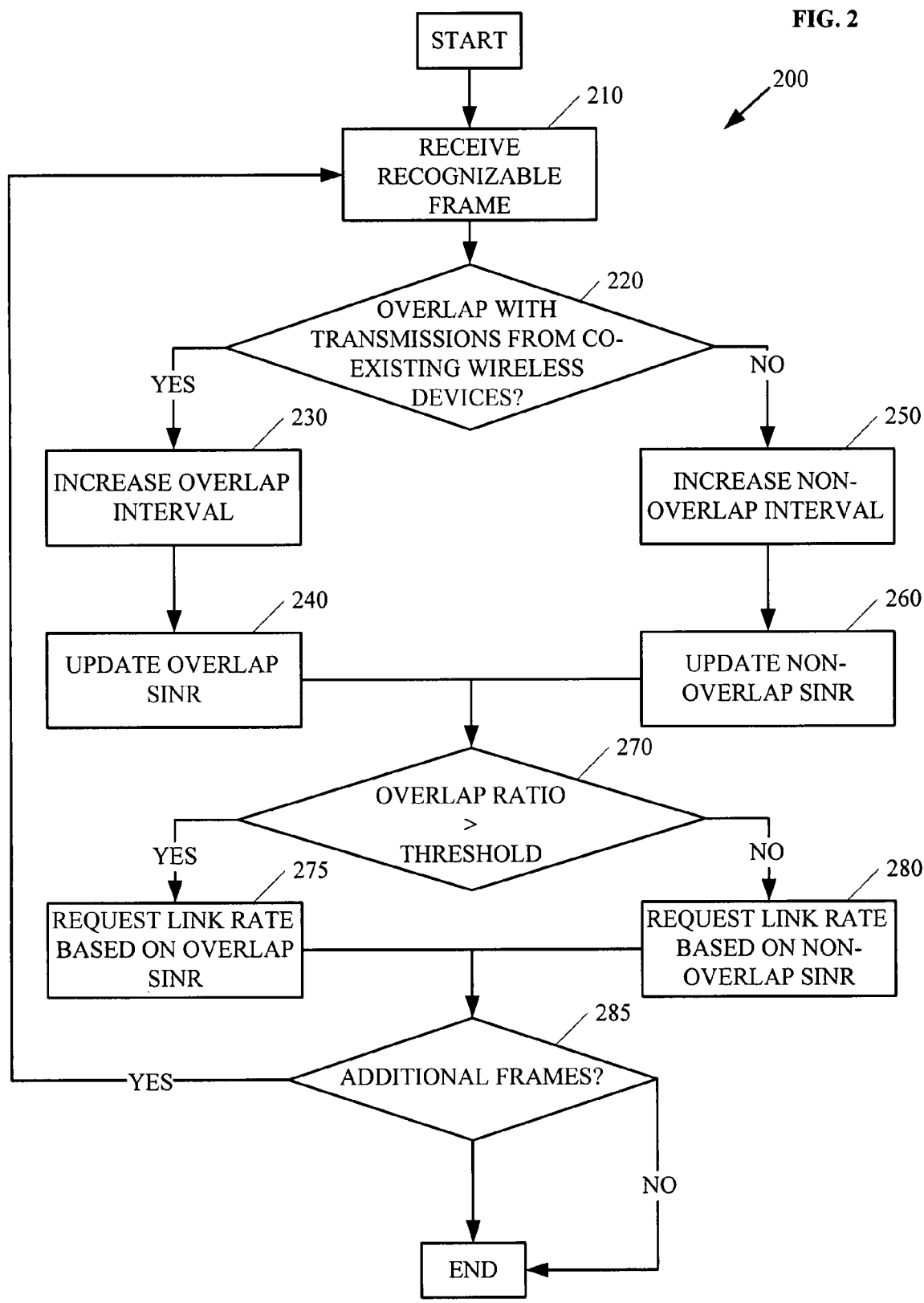
FIG. 2 depicts a flowchart of an embodiment of a method for link rate adaptation in MRPs.

Turning now to FIG. 2, there is shown a flowchart of an embodiment of a method for link rate adaptation in MRPs. Flowchart 200 of FIG. 2 includes receiving a recognizable frame over a wireless channel (element 210) by a wireless device on an MRP. A recognizable frame is a frame with a known duration for a known recipient. The duration of a recognizable frame may be known from the header information or because the entire frame was received. The recipient of a frame may be known from the header information on the frame.

The elements of flowchart 200 may be executed by a device such as MRP 300 in FIG. 3. MRP 300 includes two wireless devices, wireless device 305 and wireless device 310. Wireless devices 305 and 310 respectively contain an SINR measurer (315, 360), a transmitter (320, 365), a receiver (325, 370), and a processor (330, 375). A pin (380, 385) goes from the transmitter (365, 320) of each wireless device (310, 305) to the processor of the other (330, 375). The pin (380, 385) may be used to signal when the transmitter (365, 320) is transmitting. Receiver 325 of wireless device 305 may receive a recognizable frame and overlap detector 335 of processor 330 may determine the duration of the frame.

Turning back to FIG. 2, the method of flowchart 200 includes determining if there is an overlap between the reception of the recognizable frame and transmissions from co-existing radios, other wireless devices that are contained on the MRP (element 220). An overlap occurs if a co-existing wireless device engages in transmitting during the reception of the recognizable frame. A hardware interface may indicate to a wireless device that a co-existing wireless device is transmitting. The two wireless devices may be connected by a 2 interconnect pin. When the first wireless device is transmitting, it may raise the first line to high. Similarly, the second wireless device may indicate that it is transmitting by raising the second line to high. A software interface could similarly inform a wireless device of the transmitting of a co-existing wireless device in the MRP. In the example of FIG. 3, overlap detector 335, using information sent over pin 380 about transmissions by transmitter 365, may determine whether there is an overlap.

If receipt of the recognizable frame by a wireless device of an MRP is overlapped by transmitting by another wireless device in the MRP, then statistics about reception during overlapping are updated. An overlap interval counter $N_{Overlap}$ is incremented (element 230). In some embodiments, $N_{Overlap}$ may be incremented by 1. In other embodiments, $N_{Overlap}$ may be incremented by the duration of the recognizable frame in some units of measurement, such as μ-seconds. In addition, statistics about the SINR at the wireless device during overlap conditions are updated (element 240). Conversely, if receipt of the recognizable frame by one of the radios did not overlap transmitting by another wireless device in the MRP, then statistics about reception during overlapping are updating. The non-overlap interval counter $N_{Non-overlap}$ is incremented (element 250) and statistics about the SINR during non-overlap conditions are updated (element 260). In the example of FIG. 3, the updating indicated by elements 230, 240, 250, 260 may be performed by reception statistics module 340, included in processor 330. Reception statistics module 340 includes SINR data module 345 to update SINR data for overlapping and non-overlapping cases and overlap data module 350 to update the interval counters $N_{Overlap}$ and $N_{Non-overlap}$.

Flowchart 200 includes selecting an appropriate link rate for reception by the wireless device of the MRP. In flowchart 200, the determination includes comparing the ratio of overlapping reception to total reception with a threshold value, $Th_{Overlap}$. The inequality $$N_{Overlap}/(N_{Non-overlap}+N_{Overlap}) > Th_{Overlap} \text{ (element 270)}$$

is evaluated, by plugging in the values calculated for $N_{Overlap}$ and $N_{Non-overlap}$ in elements 230 and 250. If the inequality holds true for the actual values, then a link rate based on the SINR level during overlapping may be requested (element 275). Otherwise, a link rate based on the SINR level during non-overlapping may be requested (280).

Basing a link rate on an SINR value may be obtained by table look-up. The receiving wireless device may, for example, contain a table of SINR ranges and link rates. Given an SINR level, the entry in the table with a range of SINR levels containing the SINR level is found, and the link rate corresponding to the SINR range is requested. Alternatively, the receiving wireless device may transmit to the transmitting wireless device the SINR level to be used to select a link rate. The transmitting wireless device may perform a table look-up. In the embodiment of FIG. 3, link rate chooser 355 may evaluate the inequality of element 270, select a link rate based on the appropriate SINR level, and request the rate of the wireless device transmitting to wireless device 305.

The rate adjustment can be made on per-frame basis or over a suitable time interval, depending on the specific wireless technology used. The proposed method can be readily applied to 802.11n and 802.16 wireless devices at the MRP. For IEE standards 802.11n and 802.16, the feedback mechanism from receiver to the sender has already been defined, and the data frame transmission rate can be negotiated via control frame exchange between sender and receiver. To apply the proposed method to 802.11 a/b/g wireless devices at the MRP may require some subterfuge to circumvent the requirements of the protocols. Under the protocols, the transmitter itself estimates the channel condition based on transmission histories (successes or failures). To obtain the link rate specified by flowchart 200, a receiver (station) can send a re-association request to sender (access point) with updated support rates which only include rates equal to or higher than the desired link rate. The sender may then be forced to transmit to the receiver with the "supported" higher transmission rate(s). With this technique, overlapping transmissions from other co-existing radios will not force the sender to reduce the transmission rate.

The method of flowchart 200 may enable a higher rate of reception during periods of low transmission by the wireless devices of an MRP. During these periods, the ratio on the left hand of the inequality may be less than the threshold parameter, and a link rate based upon an SINR during non-interference may be selected. This may be a high link rate, allowing a high throughput. In addition, the high link rate, by reducing reception time, may reduce inter-radio interference.

Conversely, this method may enable correct reception of packets during periods of high inter-radio interference. For example, if the traffic load at one wireless device of an MRP is high and it transmits all the time, it may not be possible to reduce the overlapping probability solely via minimizing packet receiving duration at another wireless device. In such a case, the other wireless device will need to have packets transmitted to it at a lower suitable rate so that it can receive them correctly. In such circumstances, a lower link rate based upon the overlap SINR will be requested.

In some embodiments, the threshold parameter $Th_{Overlap}$ may optimistically be set equal to 1. This value may reflect an assessment that interference from co-existing platforms is sufficiently infrequent that it may be ignored. In this case, a link rate based upon non-interfering SINRs will always be used. In such a case, the algorithm of FIG. 2 may be simplified. When a wireless device at an MRP is receiving a frame, it may determine whether or not some other co-existing wireless device is transmitting. If there is no overlapping transmission, the receiving wireless device may follow the existing defined link rate adaptation method. On the other hand, if there is an overlapping transmission, the receiving wireless device will disregard the low SINR caused by the overlapping transmission, and request the sender to retain the previously used transmission rate, if needed. With this value of $Th_{Overlap}$, it is unnecessary to keep track of NOverlap, $N_{Non-overlap}$, and the overlap SINR statistics. The inequality of element 270 will never be satisfied, and a link rate based upon non-overlap SINR statistics will be selected.

The motivation behind this simplified method is that, by using the highest rate allowed by the channel condition, the packet receiving duration will be minimized. This reduction of receiving duration may reduce the probability of interference caused by an overlap between transmission from one wireless device of an MRP and reception at another. Under the assumption that the transmissions from the transmitting wireless device B are unchanged, a higher link rate leads to fewer overlaps. The probability of an overlapping between receiving by one wireless device of the MRP and transmitting by another may be proportional to the packet receiving duration at the receiving wireless device. The longer the packet receiving duration, the higher is the probability of overlapping. The reduction in overlaps may also increase the number of successful receptions.

Turning to FIG. 4, included are two graphs which illustrate how the simplified method may reduce interference from co-existing devices and improve reception. Graphs 400 and 450 show the receipt of packets (receiving packets 405, 455) by wireless device A of an MRP and the transmitting of packets (transmitting packets 410, 460) by wireless device B of the MRP over time (time lines 415 and 470). In FIG. 4, an intersection between a rectangle representing a receiving packet and a rectangle representing a transmitting packet represents an overlap between wireless device A receiving a packet and wireless device B transmitting a packet. FIG. 4 includes overlap 420 in graph 400 and overlap 475 in graph 450.

Graph 400 may represent reception when using a higher link rate based upon non-overlapping SINR values, while graph 450 may represent reception when using a lower link rate based upon actual SINR values. The transmitting packets (410, 460) are of equal duration in both graphs. The receiving packets 405 in graph 400 are of smaller duration, and thus are depicted as thinner, than the receiving packets 455 in graph 450. The smaller duration of the receiving packets in graph 400 may be caused by reception at a higher link rate.

As illustrated in FIG. 4, retaining a higher link rate at wireless device A despite some inter-radio interference may result in less interference and increased throughput than switching to a lower link rate. Thus, in FIG. 4, there is one overlap in graph 400, which represents reception at a higher link rate, and 5 overlaps in graph 450, which represents reception at a lower link rate. In the example of FIG. 4, the lower link rate of graph 450 as compared to graph 400 leads to more overlapping and thus more interference.

Returning to FIG. 2, other values may be used for the threshold value $Th_{Overlap}$. The value may conservatively be set equal to 0. This value may reflect an assessment that interference from co-existing radios is so prevalent that the link rate should be premised upon near-constant interference from them. More generally, the value of $Th_{Overlap}$ may be tuned for different applications to attempt to optimize reception. One objective may be to maximize throughput, the number of transmissions that can be successfully received. A higher data rate may enable faster reception of frames, thereby minimizing interference. A lower data rate may enable better reception despite interference. It may be difficult to calculate an optimal $Th_{Overlap}$. Instead, an experiment or simulation may be used to determine an appropriate value of $Th_{Overlap}$.

If there are additional frames to receive (element 285), each element of flowchart 200 from element 210 to element 280 may be repeated. Otherwise, the link rate adaptation method of FIG. 2 may end.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another, as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc., including wireless access mechanisms. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

It will be apparent to those skilled in the art having the benefit of this disclosure that the present invention contemplates methods and arrangements for link rate adaptation in MRPs. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of wireless communication of a multiple radio platform (MRP), the method comprising:
   determining an overlap between receiving by a wireless device of the MRP and transmitting by other of the wireless devices of the MRP;
   selecting a link rate of the wireless device based upon the determining, wherein the determining an overlap and the selecting a link rate comprise:
   determining a ratio,
      the numerator of the ratio a measure of overlap between receiving by the wireless device and transmitting by the other of the wireless devices, and
      the denominator of the ratio a measure of the total of overlap and non-overlap between receiving by the wireless device and transmitting by the other of the wireless devices;
   applying a first method of selecting a link rate based upon a determination that the ratio is greater than a threshold ratio; and applying a second method of selecting a link rate based upon determining that the ratio is less than a threshold ratio; and communicating the selected link rate to a second wireless device transmitting to the wireless device.

2. The method of claim 1, wherein:
the determining a ratio comprises:
receiving a recognizable frame;
determining whether there is an overlap between receiving by the wireless device and transmitting by the other of the wireless devices during the receiving of the recognizable frame;
updating a non-overlapping interval and a non-overlapping Signal-to-Interference-Plus-Noise-Ratio (SINR) value based upon a determination there is no overlap;
updating an overlapping interval and an overlapping SINR value based upon a determination there is an overlap; and
dividing the overlapping interval by the total of the non-overlapping interval and the overlapping interval;
applying a first method comprises selecting a link rate based upon the overlapping SINR value; and
applying a second method comprises selecting a link rate based upon the non-overlapping SINR value.

3. The method of claim 2, further comprising setting the threshold ratio to 0.

4. The method of claim 2, further comprising setting the threshold ratio to 1.

5. The method of claim 2, further comprising tuning the threshold ratio based on effects on reception.

6. The method of claim 2, further comprising applying time-division coordination mechanisms.

7. The method of claim 1, wherein the communicating comprises sending a re-association request to the second wireless device, the re-association request omitting link rates lower than the selected link rate from the link rates supported by the wireless device.

8. An apparatus for wireless communications, the apparatus comprising:
a first wireless device, the wireless device comprising a receiver and a transmitter, the receiver to receive wireless transmissions and the transmitter to transmit wireless transmissions;
a second wireless device, the wireless device comprising a transmitter to transmit wireless transmissions;
a processor to determine an overlap between receiving by the first wireless device and transmitting by the second wireless device and to select a link rate of the first wireless device based upon the determination of an overlap; wherein the first wireless device is to communicate the determined link rate to a third wireless device transmitting to the first wireless device; and
an interconnect pin connected to the transmitter of the second wireless device to signal to the processor that the transmitter of the second wireless device is transmitting.

9. The apparatus of claim 8, wherein:
the apparatus comprises an SINR-measurer to measure a signal-to-interference-plus-noise ratio (SINR) of transmissions received by the receiver and to send the measurement to the processor; and
the processor comprises a link-rate determiner to receive the SINR measurement and to determine a link rate based upon the SINR measurement.

10. The apparatus of claim 8, wherein the processor comprises:
an overlap detection module to determine whether there is an overlap between receiving by the receiver of the first wireless device and transmitting by the transmitter of the second wireless device; and
a link rate chooser to choose the link rate previously used by the third wireless device to transmit to the first wireless device if the overlap detection module determines an overlap between receiving by the receiver of the first wireless device and transmitting by the transmitter of the second wireless device.

11. The apparatus of claim 8, wherein the processor comprises:
an overlap detection module to determine whether there is an overlap between receiving by the receiver of the first wireless device and transmitting by the transmitter of the second wireless device during the reception of a recognizable frame;
a reception statistics module to update a non-overlapping interval and a non-overlapping SINR value based upon a determination there is no overlap and to update an overlapping interval and an overlapping SINR value based upon a determination there is an overlap; and
a link rate chooser to:
determine a ratio, the numerator of the ratio based upon the overlapping interval and the denominator of the ratio based upon the total of the overlapping interval and non-overlapping interval; and
select a link rate based upon the overlapping SINR value based upon a determination that the ratio is greater than a threshold ratio and to select a link rate based upon the non-overlapping SINR value based upon a determination that the ratio is less than a threshold ratio.

12. A method of wireless communication of a multiple radio platform (MRP), the method comprising:
determining an overlap between receiving by a wireless device of the MRP and transmitting by other of the wireless devices of the MRP; and
selecting a link rate of the wireless device based upon the determining, wherein
the determining an overlap and the selecting a link rate comprise:
receiving a recognizable frame;
determining whether there is an overlap between receiving by the wireless device and transmitting by the other of the wireless devices during the receiving of the recognizable frame;
updating a non-overlapping SINR value based upon a determination there is no overlap;
updating an overlapping SINR value based upon a determination there is an overlap;
selecting a non-overlapping link rate based upon the non-overlapping SINR value; and
selecting an overlapping link rate based upon the overlapping SINR value; and
communicating the selected link rate to a second wireless device transmitting to the wireless device, wherein the communicating comprises:
communicating the non-overlapping link rate to the second wireless device; and receiving a transmission from the second wireless device at the non-overlapping link rate; and
communicating the overlapping link rate to the second wireless device; and receiving a transmission from the second wireless device at the overlapping link rate.

13. The method of claim 12, wherein the communicating the selected link rate to the second wireless device comprises sending a re-association request to the second wireless device, the re-association request omitting link rates lower than the selected link rate from the link rates supported by the wireless device.

14. The method of claim 12, wherein:
the determining an overlap comprises determining whether there is an overlap between receiving by the wireless device and transmitting by the other of the wireless devices; and
the selecting a link rate comprises selecting a link rate previously used by the second wireless device to transmit to the wireless device in the absence of overlap between receiving by the wireless device and transmitting by the other of the wireless devices.

* * * * *